UNITED STATES PATENT OFFICE.

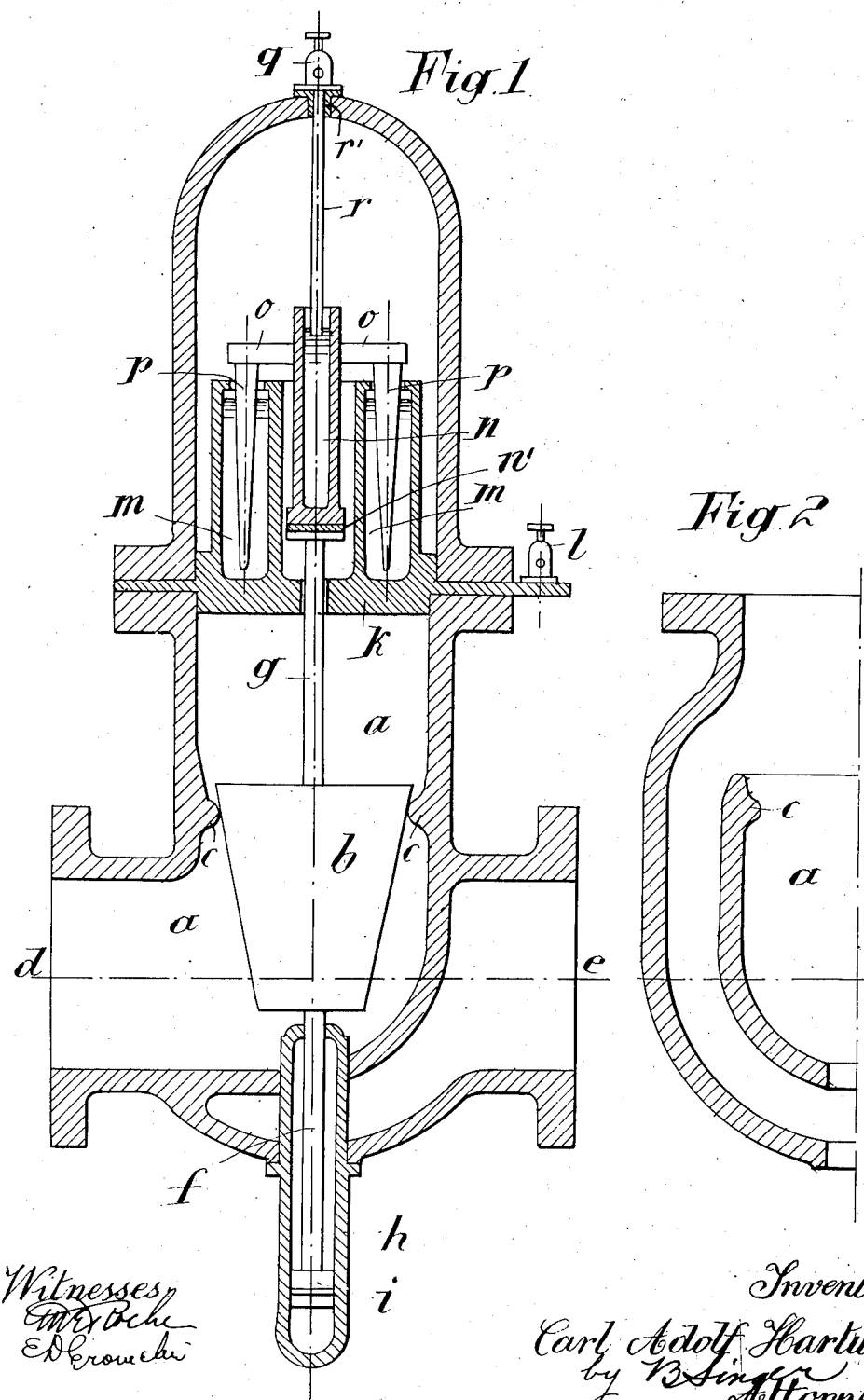

CARL ADOLF HARTUNG, OF BERLIN, GERMANY.

DEVICE FOR MEASURING FLUID.

1,027,250.  Specification of Letters Patent.  Patented May 21, 1912.

Application filed December 4, 1911. Serial No. 663,926.

*To all whom it may concern:*

Be it known that I, CARL ADOLF HARTUNG, a subject of the Emperor of Germany, and resident of 9 Köthenerstrasse 22, Berlin, W., Germany, have invented certain new and useful Improvements in Devices for Measuring Fluid.

My present invention relates to improvements in and is connected with apparatus for measuring the velocity or pressure of fluid through conveying means such as pipes, in which a member, such as an impact actuated valve member, is displaced by the fluid, proportionate to the velocity or pressure thereof, and which comes to rest at a position termed zero, when no fluid is passing through the conveying means in which such member is placed.

The principal object of my invention is to indirectly enable the movement of the valve member to be recorded through an electrical current, the intensity of which varies according to movement thereof, and in the course of which current may be disposed, recording apparatus of any suitable design, operable upon fluctuation of the electric circuit.

In the drawings, forming a part of this specification: Figure 1, is a central vertical longitudinal section of the device embodying my invention. Fig. 2 is a partial cross-sectional view through a portion of the device as disclosed in Fig. 1.

A valve casing $a$ is provided with an inlet opening $d$ and an outlet opening $e$, communication between the two openings being controlled by a vertically movable impact actuated valve member $b$ which, when seated upon valve seat $c$ closes communication between the two openings. As shown in the drawings, the inflowing fluid, entering at $d$, raises the member $b$, passes around the seat $c$ down laterally of the confining walls of inlet $d$ and then has egress at $e$.

The member $b$ which, as shown in the drawing, is in the form of a tapering plug, is guided vertically by rod $f$, which enters a cylinder $h$, adapted to confine fluid, a piston $i$ being carried by the rod $f$ and adapted to serve as a dash pot to transfer the fluid from one side of the piston to the other in order to avoid rapid movement of the member $b$.

Because of the weight of the member $b$ and parts associated therewith, the fluid entering at $d$ must overcome the resistance to movement thereof, and according to the rise or fall of fluid pressure the member $b$ fluctuates accordingly increasing the size of the opening afforded from entrance $d$ to outlet $e$, as the pressure or velocity of flow increases.

The upper portion $k$ of the casing $a$ is conveniently formed, of a plurality of parts, to facilitate assemblage. This portion $k$ carries a receptacle $m$ for mercury, while a rod $g$ secured to member $b$ and passing freely through the lower portion of portion $k$, carries a receptacle $n$, also for mercury.

The receptacle $n$ is insulated from the rod $g$ and consequently from the other portions of the valve, by insulation material $n'$, or any other suitable arrangement may be substituted therefor.

Extending laterally of the receptacle $n$ are arms $o$ preferably symmetrically disposed, each of which carries a downwardly tapering or inverted conical rod $p$ which dips into the mercury, and is raised or lowered according to the movement of the member $b$.

A rod $r$ is rigidly carried by the portion $k$, insulated therefrom, as at $r'$, and dips into the mercury in receptacle $n$, a binding post $l$ is suitably connected to the portion $k$ and a binding post $q$ in connection with rod $r$ serves to electrically connect the apparatus with any suitable electric generator and recording apparatus not shown in the drawings.

The operation of the device is as follows: When the fluid pressure in the valve casing $a$, at the inlet $d$ increases, the member $b$ is raised and the rods $p$ are lifted upwardly so that there is less surface contact with the mercury. The resistance in the circuit is accordingly increased, and by the reduction of current at the recording apparatus, the same is adapted to record the fluctuation of the member. As pressure at $d$ increases, the member $b$ falls and the resistance in the circuit from $l$ to $q$, is accordingly decreased. The rods $p$ are conically shaped inasmuch as the member $b$ is also of conical form, and in order to proportion the resistance in the circuit by movement of the rods $p$ with respect to the mercury, to the increase of the present area afforded to the fluid from the inlet $d$ to outlet $e$, the rods $p$, at various degrees of elevation, must decrease in section progressively, and likewise, in dropping, increase in section progressively.

In order to prevent fluctuations of the temperature surrounding the apparatus, or the temperature of the fluid flowing through the apparatus, affecting the circuit resistance, the receptacles m and n, and the rod g are constructed of different materials which, when altered by a change in temperature, alter mutually to avoid change in the resistance. In other words, when the member b is at rest, there is no fluctuation in the resistance of the electric circuit from binding posts l to q.

While I have herein specified mercury as the fluid coöperating with the movable elements for attaining a variable resistance, it is to be understood that I do not limit myself to this specific fluid since any fluid serving a like purpose may be substituted therefor without departing from the spirit of my invention.

I claim:

1. In measuring devices for fluid, the combination with conveying means for fluid, of a vertically movable impact actuated valve member disposed in the path of movement of the fluid through said conveying means and actuated thereby, a receptacle containing mercury, a rod, dipping into the mercury in said receptacle, and operatively connected to said valve member to alter its position with respect to said mercury responsive to movement of the said valve member, and means electrically connecting said receptacle and rod, whereby a varying resistance is formed in the electric circuit, responsive to movement of the said valve member.

2. In measuring devices for fluid, the combination with conveying means for fluid, of a vertically movable impact actuated valve member disposed in the path of movement of the fluid through said conveying means and actuated thereby, a receptacle containing mercury, a plurality of rods symmetrically disposed with respect to the axis of movement of said valve member, dipping into said mercury in said receptacle, and operatively connected to said valve member to alter their position with respect to the said mercury responsive to movement of the said valve member, and means electrically connecting said receptacle and rods, whereby a varying resistance is formed in the electric circuit responsive to movement of the said valve member.

3. In measuring devices for fluid, the combination of a valve casing for conveying fluid, said valve casing having a horizontally disposed valve seat, an impact actuated valve member for said valve disposed in the path of movement of the fluid, means for guiding said valve member in substantially a vertical path of movement, a receptacle, containing mercury, carried by and disposed symmetrically with respect to the axis of movement of said valve member, said receptacle being insulated from said valve member, a rod dipping into the mercury in said receptacle, a resistant means operatively connected to said receptacle and actuated upon movement thereof, and means for electrically connecting said rod and resistance means whereby a varying resistance is formed in the electrical circuit, responsive to movement of said valve member.

In testimony whereof I have hereunto set my hand in presence of two witnesses.

CARL ADOLF HARTUNG.

Witnesses:
   LOUISE KLOCKE,
   HELENA SURMA.